United States Patent
Tsai et al.

(10) Patent No.: US 7,853,815 B2
(45) Date of Patent: Dec. 14, 2010

(54) METHOD AND APPARATUS FOR CONTROLLING POWER SUPPLY IN A COMPUTER SYSTEM UNDER LOW POWER CONSUMPTION MODE

(75) Inventors: Ping-Yen Tsai, Taipei (TW); Tsung-Ping Liu, Taipei (TW)

(73) Assignee: ASUSTeK Computer Inc., Peitou, Taipei (TW)

( * ) Notice: Subject to any disclaimer, the term of this patent is extended or adjusted under 35 U.S.C. 154(b) by 696 days.

(21) Appl. No.: 11/717,196

(22) Filed: Mar. 13, 2007

(65) Prior Publication Data
US 2007/0220290 A1    Sep. 20, 2007

(30) Foreign Application Priority Data
Mar. 17, 2006  (TW) ............... 95109335 A

(51) Int. Cl.
*G06F 1/26* (2006.01)
(52) U.S. Cl. ............ 713/323; 713/300; 713/320
(58) Field of Classification Search ......... 713/300, 713/323, 320
See application file for complete search history.

(56) References Cited

U.S. PATENT DOCUMENTS

| | | | |
|---|---|---|---|
| 5,714,870 A | 2/1998 | Dunstan | |
| 6,665,801 B1 | 12/2003 | Weiss | |
| 6,895,448 B2 * | 5/2005 | Chan et al. | 710/14 |
| 7,451,328 B2 * | 11/2008 | Hsieh | 713/300 |
| 2003/0110403 A1 * | 6/2003 | Crutchfield et al. | 713/300 |
| 2003/0135766 A1 * | 7/2003 | Zyskowski et al. | 713/300 |
| 2006/0035527 A1 * | 2/2006 | Numano | 439/668 |

FOREIGN PATENT DOCUMENTS

| | | |
|---|---|---|
| CN | 2646930 Y | 10/2004 |
| CN | 2765245 Y | 3/2006 |
| CN | 2765254 Y | 3/2006 |
| TW | 573762 | 1/2004 |

* cited by examiner

*Primary Examiner*—Nitin C Patel
(74) *Attorney, Agent, or Firm*—Winston Hsu; Scott Margo

(57) ABSTRACT

A method for controlling power supply in a computer system includes receiving a control command, and providing power through an interface of the computer system when the computer system is operating in a low power consumption mode.

14 Claims, 5 Drawing Sheets

METHOD AND APPARATUS FOR CONTROLLING POWER SUPPLY IN A COMPUTER SYSTEM UNDER LOW POWER CONSUMPTION MODE

BACKGROUND OF THE INVENTION

1. Field of the Invention

The invention relates to a method for controlling power supply of a computer system, and more particularly, to a method for providing power through an interface of the computer system when the computer system is operating under a sleep mode or a power off mode.

2. Description of the Prior Art

As technology advances, portable electronic devices such as cellular phones, digital cameras, and MP3 players are able to achieve tasks such as battery charging and data exchange by connecting to an interface (i.e. USB or IEEE 1394) of a computer system. However, due to the fact that the computer system only expends very little electrical power, or even no power at all to the output interface while the system is operating under a sleep mode or a power off mode, the aforementioned tasks can only be accomplished while the computer system is turned on.

The aforementioned sleep mode refers to a state similar to a power off condition of a computer system, in which the sleep mode typically involves a Suspend To Ram mode or a Suspend To Disk mode defined by the Advanced Configuration & Power Interface. The Advanced Configuration & Power Interface is a standard governed by Microsoft Corporation, Intel Corporation, and Toshiba Corporation, in which the standard establishes a power management program that assigns the task of power management to an operating system. The Advanced Configuration & Power Interface standard divides categories including operating system, hardware environment, and power consumption into four modes, including global mode, device mode, sleeping mode, and CPU mode. The sleep mode can be subcategorized into five modes:

1. S1 Mode: An Idle mode. Under this mode, the system is able to return to the normal operating condition quickly and no data are lost. Additionally, the output screen signal is turned off, and the operation of hard-drive is stopped. However, all interfaces are supplied with power.
2. S2 Mode: A mode similar to the S1 mode. However, data between CPU and cache memory is lost under this mode, and has to be maintained after the system recovers.
3. S3 Mode: A Suspend To Ram mode. All data, except the memory data are lost under this mode, in which the data stored in the memory is maintained by the hardware while power is still supplied to the memory. After entering this mode, all data stored in the memory are stayed intact, and a false power off conditioned is initiated. Under the false power off condition, power is only supplied to the memory, whereas power supplying to other equipments, devices, and interfaces is stopped. After rebooting, computer will verify the data stored in the memory and return back to a screen appeared before S3 mode was entered.
4. S4 Mode: A Suspend To Disk mode. Lowest power consumption is achieved under this mode. Since all devices are shut down under this mode, a longer recovering time is required to return back to a normal mode. After entering this mode, all data stored in the memory of the operating system are stored in the hard drive, and power supplying to all equipments, devices, interfaces, and memories is stopped. All stored data are read to memories after the computer reboots.
5. S5 mode: A mode equivalent to a software power off mode. Power consumption is low under this mode, and no maintenance is done by the operating system. Tasks can be carried out after the computer reboots.

If the computer system is operating under S3, S4, or S5 mode, users are unable to charge a portable electronic device through a transmission port of an interface since no power is being supplied under these modes. In other words, if a computer system were to be used to charge a portable electronic device, the computer system must be turned on first. Even if a user wishes to charge the portable electronic device through a USB interface, the computer system still has to be turned on. Consequently, power waste will commonly result for the desktop computers. Power consumption is wasted in similar means for portable computers utilizing batteries. In the conventional art, even if a user wishes to use the USB interface of a portable computer to charge a cellular phone without using other functions of the portable computer, the computer still has to be turned on to achieve the task. The result not only wastes power but also significantly reduces the usage time of the portable computer.

SUMMARY OF THE INVENTION

It is therefore an objective of the present invention to provide a method for controlling power supply of a computer system and device thereof.

A method for controlling power supply of a computer system is disclosed. The method includes: receiving a control command, and providing power through an interface of the computer system when the computer system is operating under a low power consumption mode.

A power supply unit for a computer system is disclosed. The power supply unit includes a power output unit for generating power while the computer system is operating under a low power consumption mode, and an interface coupled to the power output unit for outputting the power.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
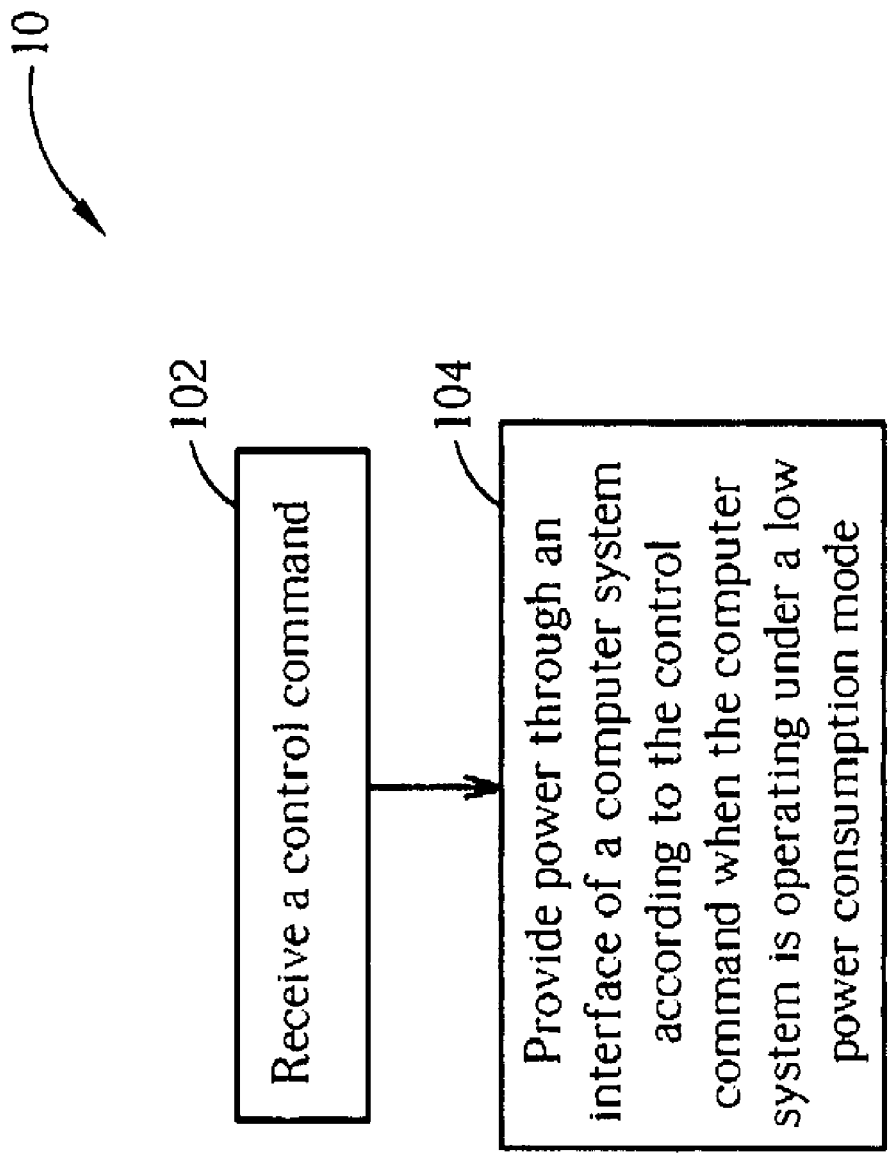
FIG. 1 is a diagram illustrating a power supply control workflow of a computer system according to an embodiment of the present invention.

Please refer to FIG. 1. FIG. 1 is a diagram illustrating a power supply control workflow 10 of a computer system according to an embodiment of the present invention. As shown in FIG. 1, the workflow 10 includes the following steps:

Step 102: Receive a control command.

Step 104: Provide power through an interface of the computer system according to the control command when the computer system is operating under a low power consumption mode.

The aforementioned low power consumption refers to a sleep mode or a power off mode, such as the S3, S4, or S5 mode defined by the Advanced Configuration & Power Interface standard described previously. The computer system is preferably a portable computer system. When the computer system is operating under a sleep mode or a power off mode, very little electrical power or even no power is expended. Hence, under this condition, the embodiment of the present invention is able to provide power through an interface of the computer system according to a control command received. The power off mode also refers to a shut down state when no operating system is executed by the computer system. In other words, despite the fact that the computer system is operating under the sleep mode or the power off mode, the computer system is still able to provide power through the interface of the computer system.

In the conventional art, the computer system must be turned on if power were to be delivered through an interface of the computer system, thereby resulting in waste of power. In contrast to the conventional art, the computer system is able to provide power through an interface of the computer system without turning on the computer system, thereby saving power consumption. For instance, a user is able to charge a portable electronic device directly through an USB interface of a portable computer without turning on the portable computer system. Ultimately, power can be saved and the usage time of the portable computer system can be extended significantly.

Additionally, when the computer system is operating under a low power consumption mode, the data transmission of the interface can be disconnected to prevent data error and save system resources. After the computer system enters from an operating mode to a sleep mode or a power off mode, a connection between some of the external electronic devices and the computer system will also be disconnected to prevent transmission error. The connection can be reestablished after the external electronic devices are reconnected to the computer system.

In other words, despite the computer system still provides power during a power off mode, the aforementioned external electronic device will stop receiving power from the computer system while the computer system enters from an operating mode to a sleep mode or a power off mode. Hence, a user must disconnect and reconnect the external electronic device to the computer system to reestablish the transmission and charge the device. To solve this problem, the power transmission link of the interface of the computer system can be temporarily disconnected and reconnected while the computer system is operating under a low power consumption mode. By doing so, the external electronic device will determine that a reconnection has been made and the power transmission link can be reestablished.

Hence, after the computer system enters from an operating mode to a sleep mode or a power off mode, the data and power transmission link of the interface of the computer system can be disconnected, and the power transmission link can be reconnected thereafter. By doing so, the electronic device connected to the interface of the computer system will be able to determine that a reconnection has been made. Thereby, power will be supplied and the device can be charged. In other words, the embodiment of the present invention is able to provide power through an interface of a computer system to an external electronic device. Ultimately, power can be saved and the usage time for portable computers utilizing battery as a power source can be extended significantly.

Figure 2:
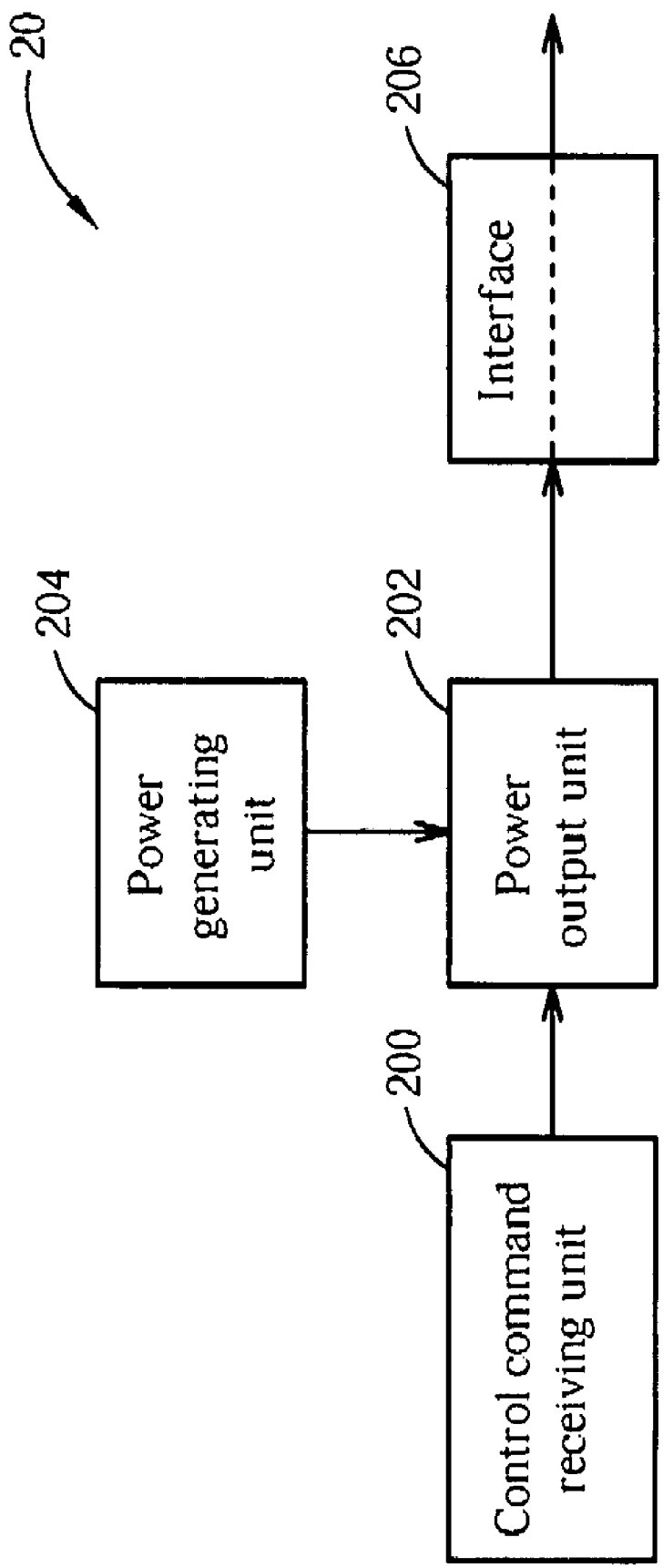
FIG. 2 is a block diagram illustrating the functions of a power supply unit of a computer system according to an embodiment of the present invention.

An implementation of the workflow 10 is shown in FIG. 2. FIG. 2 is a block diagram illustrating the functions of a power supply unit 20 of a computer system according to an embodiment of the present invention. The power supply unit 20 includes a control command receiving unit 200, a power generating unit 204, an interface 206, and a power output unit 202. The control command receiving unit 200, implemented by the Basic Input/Output System (BIOS) firmware of the computer system, serves to receives a control command. A user is able to turn certain functions of the computer system on and off by adjusting settings of the BIOS. The control command receiving unit 200 can also be a button disposed on the computer system, in which the functions of the power supply unit 20 can be turned on or off by pressing the button. The power output unit 202 serves to output power generated by the power generating unit 204 through the interface 206 according to a control command received by the control command receiving unit 200 while the computer system is operating under a low power consumption mode.

After a user initiates the power supply unit 20 through the control command receiving unit 200 to enter the S3, S4, or S5 mode, the power output unit 202 will output the power generated by the power generating unit 204 through the interface 206 to an external electronic device while the computer system is operating under a sleep or power off mode. The power generating unit 204 can be a connecting jack of an A/C adapter or an external battery, and the interface 206 can be an interface commonly found in a computer system, such as USB or IEEE1394.

Preferably, by going through the power supply unit 20, users are able to provide power through the interface 206 while the computer system is operating under a power off or sleep mode. By doing so, users are able to charge portable electronic devices such as cellular phones and MP3 players without turning on the computer system, thereby saving energy and extending the usage time of portable computers that utilize batteries as their power source.

Figure 3:
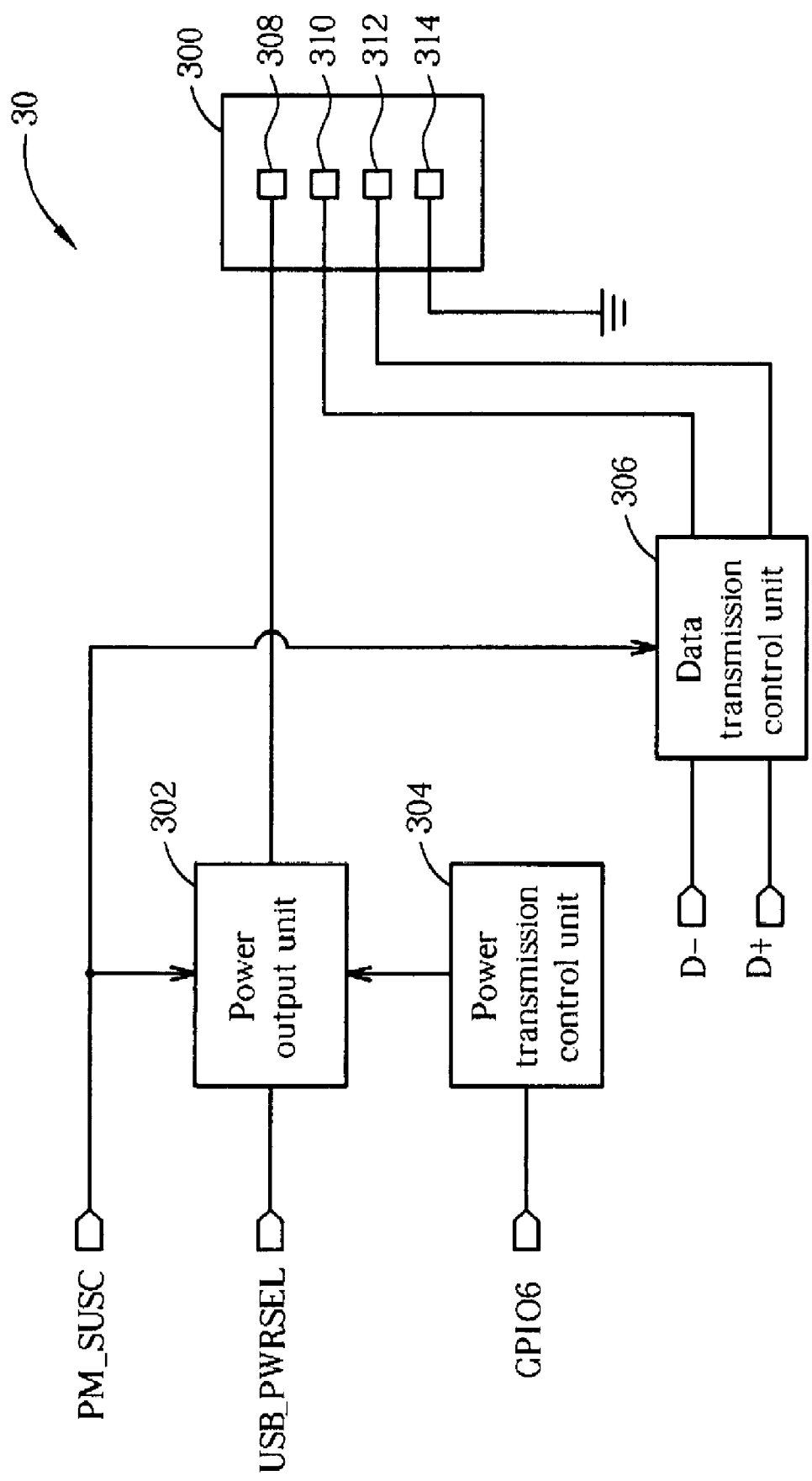
FIG. 3 is a perspective diagram illustrating a power supply unit of a computer system according to an embodiment of the present invention.

Please refer to FIG. 3. FIG. 3 is a perspective diagram illustrating a power supply unit 30 of a computer system according to an embodiment of the present invention. As shown in FIG. 3, the power supply unit 30 includes a data transmission control unit 306. The data transmission control unit 306 functions to disconnect the data transmission link of the interface 206 while the computer system is operating under a low power consumption mode, thereby preventing data transmission error and saving system energy. The power supply unit 30 also includes a power transmission control unit 304. The power transmission control unit 304 serves to temporarily disconnect and recover the power transmission link of the interface 206 when the computer system is operating under a low power consumption mode. By doing so, the external electronic device connected to the interface 206 will determine that a reconnection has been made and a new power transmission link can be established. In other words, after the computer system enters from an operating mode to a sleep or power off mode, the present invention is able to utilize the data transmission control unit 306 and the power transmission control unit 304 to disconnect the data and power transmission link of the computer system interface, and then utilize the power transmission control unit 304 to reestablish the power transmission link. By doing so, the electronic device connected to the computer system will notify that a reconnection has been made and power can be supplied once more for charging the device.

It should be noted that the aforementioned low power consumption mode refers to a sleep mode or a power off mode, such as the S3, S4 or S5 mode defined by the Advanced Configuration & Power Interface standard. The computer system is preferably a portable computer system, and the interface of the computer system is a common USB or IEEE 1394 interface. An example described in the following is involves the utilization of a USB interface. As shown in FIG. 3, the power supply unit 30 controls the power and data transmission link of a USB port 300 of the computer system. The power supply unit 30 includes a power output unit 302, a power transmission control unit 304, and a data transmission control unit 306. The power supply unit 30 controls the output of power and data to the USB port 300 according to the signals PM_SUSC, USB_PWRSEL, and GPI06. The signal PM_SUSC indicates an operating status of the computer system. If the computer system is operating under a low power consumption mode, such as a sleep mode or a power off mode, the signal PM_SUSC will be in low state. If the condition is reversed the signal PM_SUSC will be in high state. The signal USB_PWRSEL is a signal output from the control command receiving unit (not shown), in which the signal indicates a condition whether power is provided while the computer is operating under the low power consumption mode. For instance, if the signal USB_PWRSEL is in high state, the USB transmission port 300 will output power when the computer system is operating under a sleep or power off mode. The signal GPI06 serves to temporarily disconnect the power transmission link. For instance, when the signal GPI06 is in high state, the power transmission link linking to the USB port 300 is disconnected. The USB port 300 includes a plurality of pins 308, 310, 312, 314 positioned corresponding to the power source, data D−, data D+, and ground.

Hence, if a user wishes to charge an external electronic device through the USB port 300 after the computer system is operating under a sleep or power off mode, the user can access the control command receiving unit, such as the menu selection from the BIOS or the button located on the computer system, to convert the signal USB_PWRSEL into high state. After the computer system enters the sleep or power off mode, the operating system will securely remove the connecting link of the external electronic device. At this moment, the signal GPI06 will be converted to high state to temporarily disconnect the power transmission link. Subsequently, the signal GPI06 will be converted back to low state and the external electronic device will determine that a reconnection has been made, such that after the computer system enters the sleep or power off mode, the external electronic device can be charged.

Figure 4:
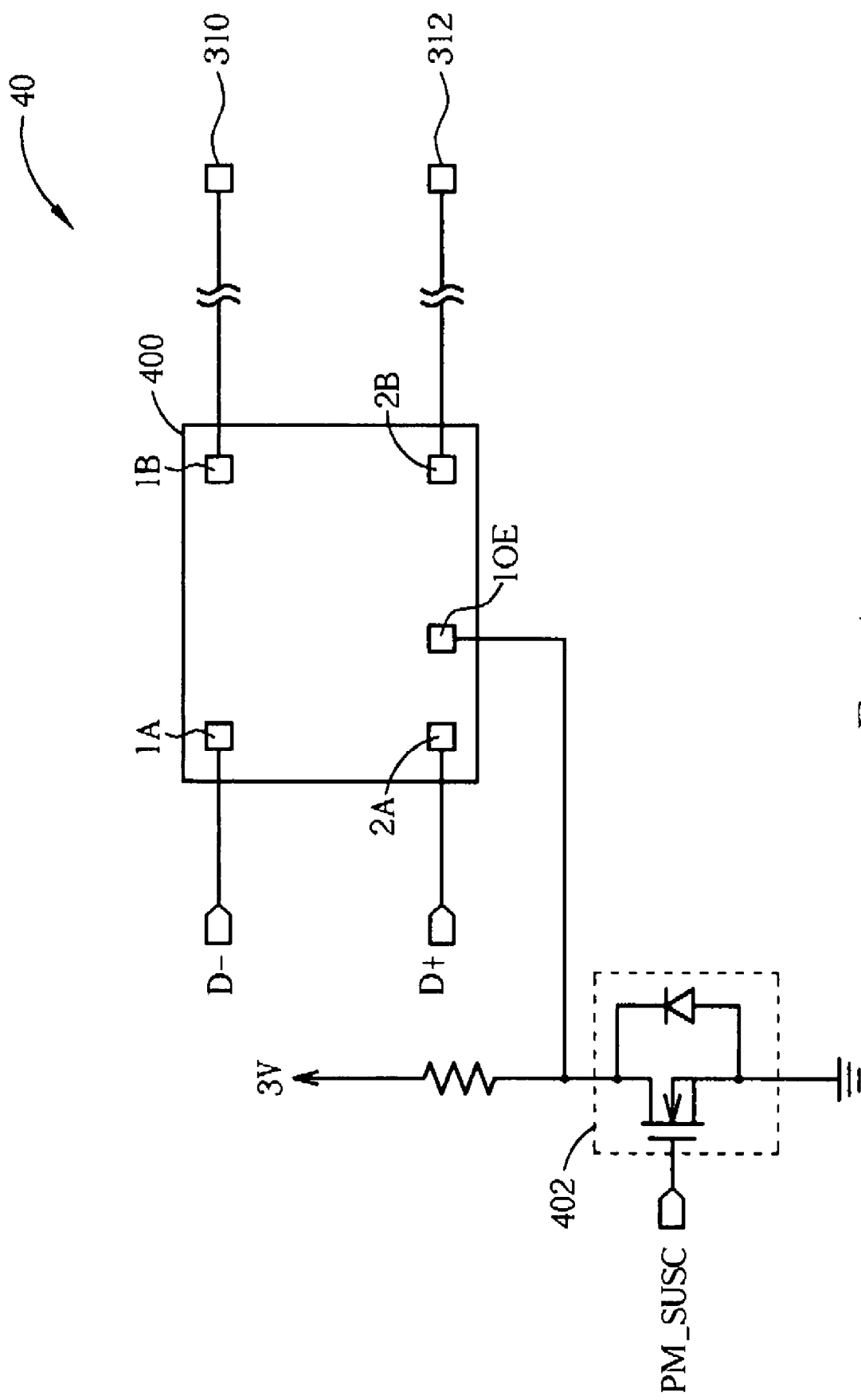
FIG. 4 is a perspective illustrating a data transmission control circuit according to an embodiment of the present invention.

Please refer to FIG. 4. FIG. 4 is a perspective illustrating a data transmission control circuit 40 according to an embodiment of the present invention. As shown in FIG. 4, the data transmission control circuit 40 implements the data transmission control unit 306 shown in FIG. 3, in which the data transmission control circuit 40 includes a bus switch 400 and a switch circuit 402. The bus switch 400 is utilized to conduct signals between pins 2A and 2B and control the signal link between the pins 1A and 1B according to the signal received by the pin 1 OE. If the signal received by the pin 1 OE is in high state, a disconnection will be observed between the pins 1A and 1B, whereas if the signal received by the pin 1 OE is in low state, a conduction will be observed between the pins 1A and 1B. Hence, if the signal PM-SUSC is in low state, the switch circuit 402 will be cutoff, the signal input to the pin 1 OE will be in high state, the pins 1A and 1B will be disconnected, and the link between the data D− and the pin 310 will be disconnected. Conversely, if the signal PM_SUSC is in high state, the switch circuit 402 will be conducted, the signal input to the pin 1 OE will be in low state, the pins 1A and 1B will be conducted, and a transmission will be established between the data D− and the pin 312.

Figure 5:
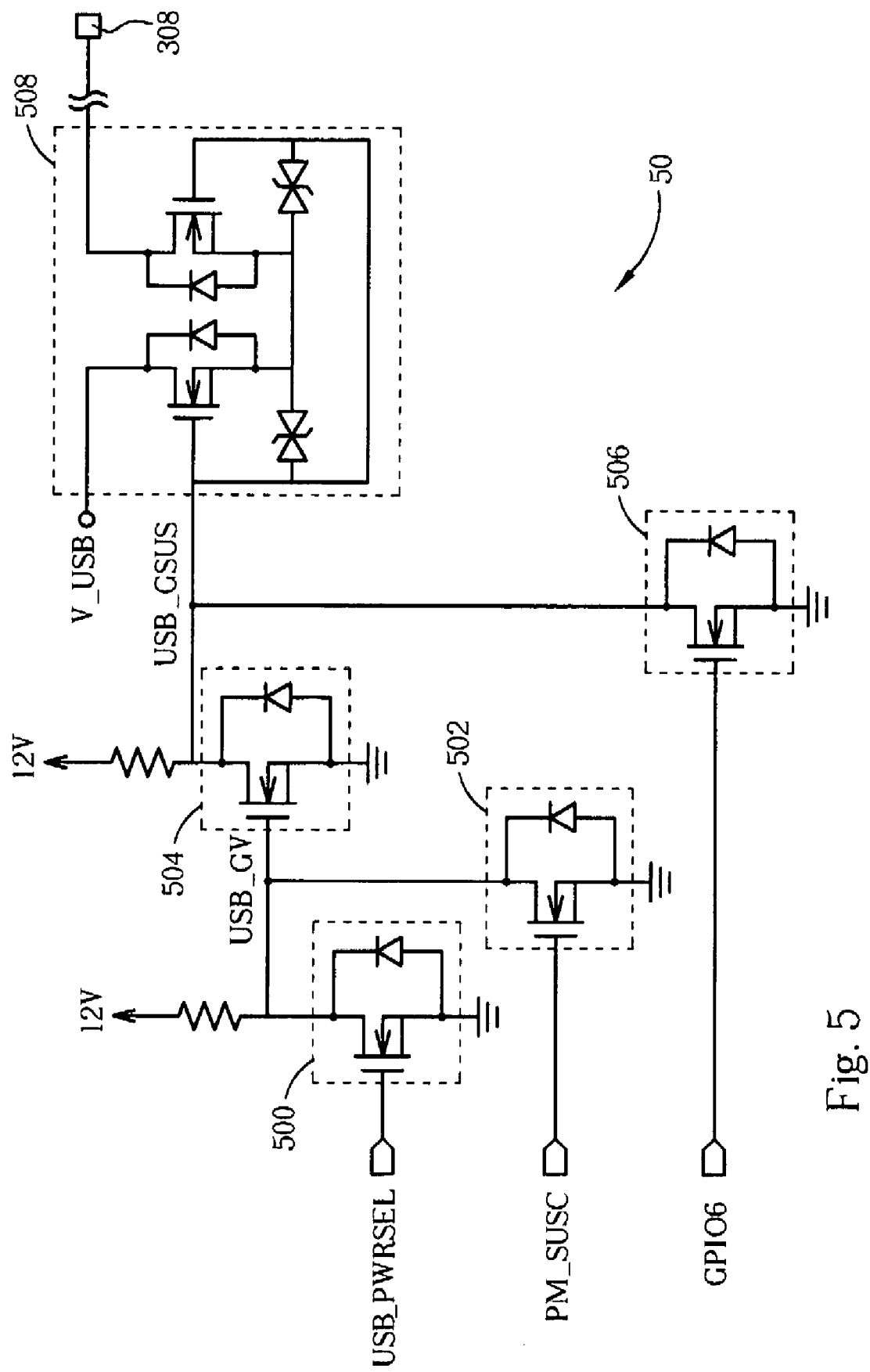
FIG. 5 is a perspective diagram illustrating a power output circuit according to an embodiment of the present invention.

Please refer to FIG. 5. FIG. 5 is a perspective diagram illustrating a power output circuit 50 according to an embodiment of the present invention. The power output circuit 50 implements the power output unit 302 and the power transmission control unit 304 shown in FIG. 3, in which the power output circuit 50 includes switch circuits 500, 502, 504, 506 and a power transmission switch circuit 508. Preferably, when the signal USB_PWRSEL is in high state, and the signal PM_SUSC is in either high state or low state, the switch circuit 500 will be conducted, the signal USB_GV will be in low state, the switch circuit 504 will be cutoff, the signal USB_GSUS will be in high state, and the power transmission switch circuit 508 will transmit the USB power V_USB to the pin 308. When the signal USB_PWRSEL is in low state and the signal PM_SUSC is in high state, the switch circuit 500 will be cutoff, the switch circuit 502 will be conducted, the signal USB_GV will be in low state, the switch circuit 504 will be cutoff, the signal USB_GSUS will be in high state, and the power transmission switch circuit 508 will transmit the USB power V_USB to the pin 308.

When the signal USB_PWRSEL is in low state and the signal PM_SUSC is also in low state, the switch circuits 500 and 502 will be cutoff, the signal USB_GV will be in high state, the switch circuit 504 will be conducted, the signal USB_GSUS will be in low state, and the USB power V_USB will not be transmitted to the pin 308 through the power transmission switch circuit 508. In other words, as long as the signal PM_USUC is in high state, the USB power V_USB can be transmitted to the pin 308, and as soon as the computer system is turned on, the USB port 300 will be able to output power. When the signal USB_PWRSEL is in high state, the power can be output through the USB port 300 after the computer system is turned off. Additionally, the switch circuit 506 implements the power transmission control unit 304 shown in FIG. 3, such that when the signal GPI06 is in high state, the switch circuit 506 will be conducted, the signal USB_GSUS will be in low state, and the USB power V_USB will not be transmitted to the pin 308 through the power transmission switch circuit 508.

As shown in FIG. 5, if a user wishes to charge an external electronic device through the USB port 300 after the computer system is operating under a sleep mode or power off mode, the user can access the control command receiving unit, such as the menu selection from the BIOS or the button located on the computer system, to convert the signal USB_PWRSEL into high state. After the computer system enters the sleep or power off mode, the operating system will securely remove the connecting link of the external electronic device. At this moment, the signal GPI06 can be temporarily converted to high state through the BIOS to temporarily disconnect the power transmission link, which can be reconnected afterwards. The external electronic device will then determine that a reconnection has been established and after the computer system enters the sleeping or power off mode, the external electronic device can be charged.

It should be noted that the data transmission control circuit 40 and the power output circuit 50 shown in FIG. 4 and FIG. 5 are only embodiments of the present invention, other circuits capable of implementing the same function are also within the scope of the present invention. The control level of the signal USB_PWRSEL can be adjusted from the BIOS or the button located on the computer system, whereas the level of the signal GPI06 can be controlled by the BIOS of the computer system.

After the computer system is connected to the power generating unit 204, such as an A/C adapter and operating under a power off mode, if the signal USB_PWRSEL is in high state, the signal USB_GSUS will also be converted to a high state according to the signal USB_PWRSEL, and the power transmission switch circuit 508 will transmit the USB power V_USB to the pin 308. After the external electronic device is connected to the computer system through the interface, the data D+ signal will be converted from low state to high state to determine whether the external electronic device is connected to the computer system through the interface. After the computer system determines that the external electronic device is ready to be charged, the USB port 300 will provide electrical power to charge the external electronic device.

Overall, the method of the present invention is able to charge an electronic device by providing power through an interface of a computer system while the computer system is operating under a sleep or power off mode. Since the interface of the conventional computer system provides no power while the computer system is operating under a sleep or power off mode, the computer system must be turned on to charge the electronic device, thereby wasting power. According to another aspect of the present invention, the data transmission link of the computer system can be disconnected to prevent data error, and the power transmission link of the interface can be temporarily disconnected and reconnected afterwards while the computer system is operating under a low power consumption mode. Hence, the present invention provides a means of charging the electronic device through interfaces such as USB or IEEE 1394 while the computer system is operating under a sleep or power off mode, thereby saving energy and extending usage time for portable computers utilizing battery as a power source.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling power supply of a computer system, comprising:
    providing power through an interface of the computer system when the computer system is operating under a low power consumption mode; and
    temporarily disconnecting and reconnecting a power transmission link of the interface for providing power when the computer system is operating under the low power consumption mode;
    wherein the low power consumption mode is a state of S3, S4 or S5 defined by Advanced Configuration & Power Interface.

2. The method for controlling power supply of a computer system of claim 1 further comprising:
    receiving a control command; and
    providing power through the interface of the computer system according to the control command when the computer system is operating under the low power consumption mode.

3. The method for controlling power supply of a computer system of claim 1 further comprising disconnecting a data transmission link of the interface when the computer system is operating under the low power consumption mode.

4. The method for controlling power supply of a computer system of claim 1 further comprising charging an electronic device through the interface of the computer system.

5. The method for controlling power supply of a computer system of claim 1, wherein the S3 state is a Suspend To Ram mode defined by Advanced Configuration & Power Interface.

6. The method for controlling power supply of a computer system of claim 1, wherein the S4 state is a Suspend To Disk mode defined by Advanced Configuration & Power Interface.

7. The method for controlling power supply of a computer system of claim 1, wherein the S5 state is a power off mode defined by Advanced Configuration & Power Interface.

8. A power supply unit for a computer system, comprising:
    a power output unit for generating a power while the computer system is operating under a low power consumption mode;
    an interface coupled to the power output unit for outputting the power; and
    a power transmission control unit for temporarily disconnecting and reconnecting a power transmission link of the interface when the computer system is operating under the low power consumption mode;
    wherein the low power consumption mode is a state of S3, S4 or S5 defined by Advanced Configuration & Power Interface.

9. The power supply unit for a computer system of claim 8 further comprising a control command receiving unit for receiving a control command, wherein the power output unit outputs the power from the interface of the computer system according to the control command when the computer system is operating under the low power consumption mode.

10. The power supply unit for a computer system of claim 8 further comprising a data transmission control unit for disconnecting a data transmission link of the interface when the computer system is operating under the low power consumption mode.

11. The power supply unit for a computer system of claim 8, wherein the interface functions to charge an electronic device.

12. The power supply unit for a computer system of claim 8, wherein the S3 state is a Suspend To Ram mode defined by Advanced Configuration & Power Interface.

13. The power supply unit for a computer system of claim 8, wherein the S4 state is a Suspend To Disk mode defined by Advanced Configuration & Power Interface.

14. The power supply unit for a computer system of claim 8, wherein S5 state is a power off mode defined by Advanced Configuration & Power Interface.

* * * * *